Figure 1:
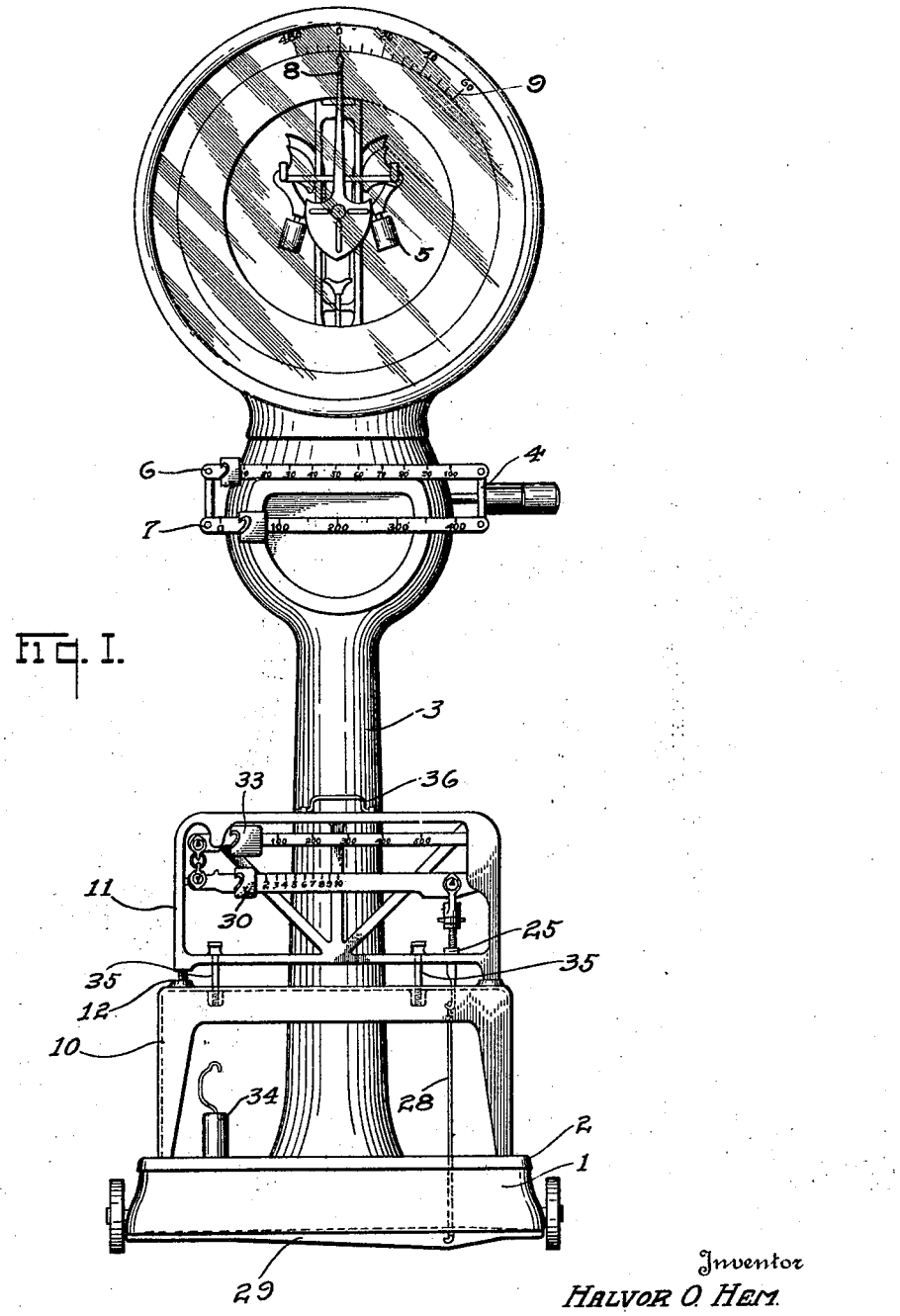

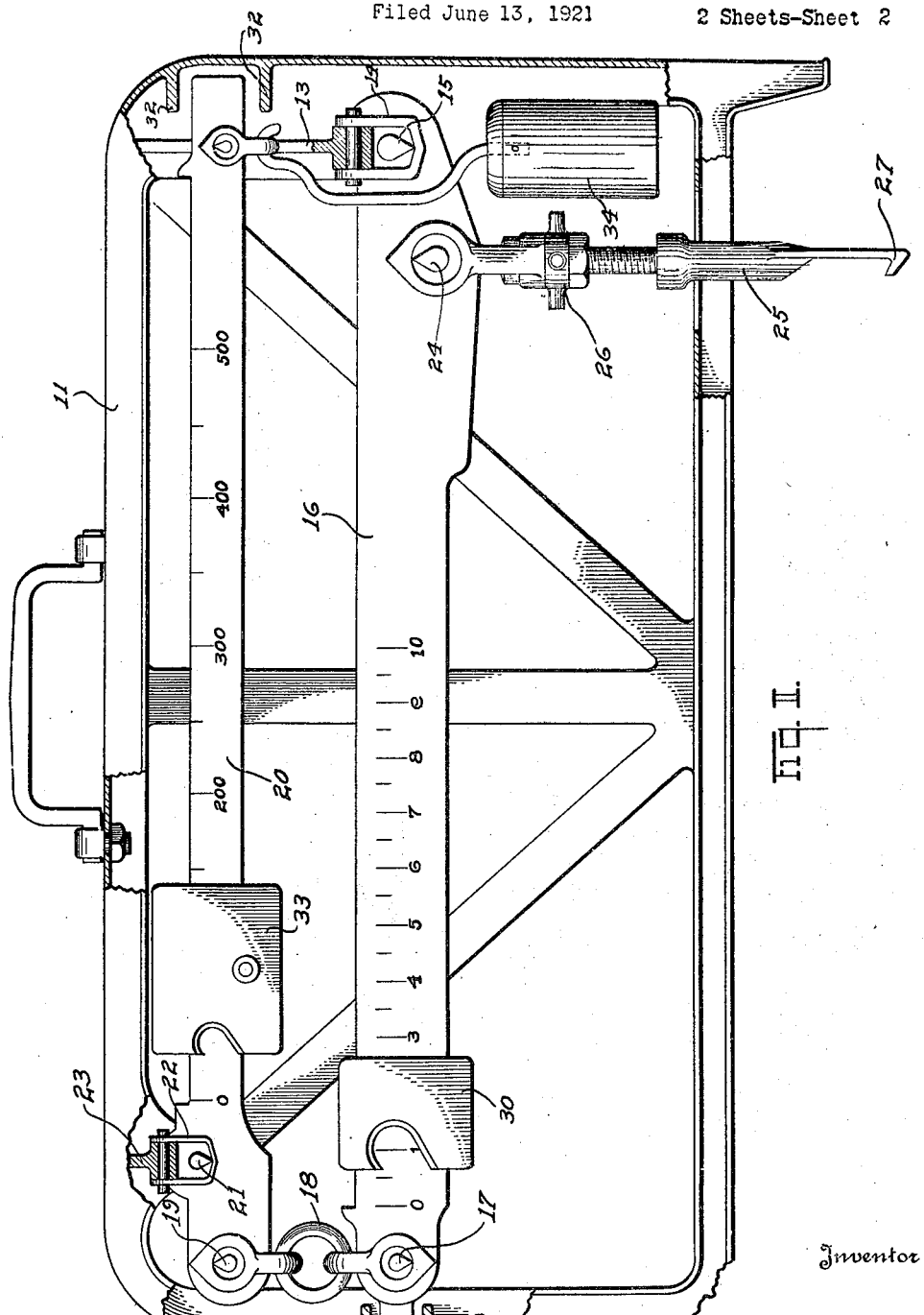

Patented Feb. 28, 1928.

1,660,672

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

SCALE-TESTING DEVICE.

Application filed June 13, 1921. Serial No. 477,151.

The transportation from place to place of several hundred pounds of standard test weights such as are used for testing heavy capacity scales is a matter involving considerable expense and great inconvenience. Sealers and scale service men who carry such weights as baggage are often delayed because of the non-arrival of the test weights at the place where a scale is to be tested, and where scales are located in remote districts the cost of securing proper periodical tests is almost prohibitive.

This invention has for its principal object the provision of a self-contained, compact, portable testing device of such light weight that it may be carried as hand baggage but which nevertheless is capable of being used in testing scales having capacities of several hundred pounds.

Another object is the provision of a device of this kind which is particularly adapted for testing automatic scales, the platforms of which, unlike those of beam scales, are further depressed when weighing heavy loads than they are when weighing light loads.

Another object is the provision of a device of this kind which is adapted for testing scales either by exerting downward pressure upon an unloaded platform or by partially offsetting the weight of a load by exerting an upward pull upon a loaded platform.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is an elevational view showing my device in position for testing a heavy capacity portable automatic scale; and Figure 2 is an enlarged detail view of a separable portion of my device, part of the frame being broken away to more clearly show the relation of the beams.

Referring to the drawings in detail, the testing device is shown as applied to an automatic scale of a well known and widely used type having a base 1 within which are housed the levers (not shown) that support the platform 2 and upon the rear end of which is a column 3 supporting the beam mechanism 4 and automatic load-offsetting mechanism 5. The scale is provided with tare and capacity beams 6 and 7 and with an indicator hand 8 co-operating with a graduated dial 9. Since the scale illustrated is not per se of my invention and the testing device may be used on any type of platform scale, I have illustrated and described the scale only in general terms.

The mechanism of the testing device is supported by separable frames 10 and 11. When the device is in position for testing a scale the frame 11 rests upon the frame 10 in the position shown in Figure 1, a leveling screw 12 being provided for the purpose of leveling the beam carrying frame 11. Supported by means of a fulcrum bracket 13 within the frame 11 is a bearing 14 of hardened steel upon which rests the knife edge fulcrum pivot 15 of a beam 16. The free end of the beam is provided with a knife edge pivot 17 which is connected by links 18 to a knife edge pivot 19 fixed in an oppositely-extending beam 20, the beam 20 being supported by means of a knife edge fulcrum pivot 21 and a hardened steel bearing 22 upon a fulcrum bracket 23.

The beam 16 is provided with a load pivot 24 from which depends a link 25, the length of which may be adjusted by means of a turn buckle 26. The lower end of the link 25 is provided with a hook 27 adapted to engage an eye in the upper end of a tension rod 28 which depends through an opening in the scale platform 2 and has its lower end connected to a cross bar 29 which extends beneath the base 1 of the scale. In order that the device may be as light as possible the frame is preferably made of aluminum.

The device is sealed to an exact weight, preferably 50 lbs. When the device is placed upon a scale in position for testing by exerting a downward pressure upon the platform, the capacity poise is moved out upon the beam 7 a sufficient distance to offset the weight of the testing apparatus. The link 25 is then shortened by means of the turn buckle 26 until the beam 20 is floated out of contact with the stops 31 and 32, the poise 30 on the beam 16 and the poise 33 on the beam 20 being at zero position. The stops 31 are merely limiting stops not ordinarily engaged by the beam.

When the testing device is in position on the platform with its weight offset by the capacity poise 7, the indicator hand 8 will, if the scale be in perfect condition, stand at zero. If the poise 33 now be moved outwardly on the beam 20 to—say the 100 lb. graduation—the beam 20 will drop into engagement with the stop 32. If the turnbuckle 26 be now tightened sufficiently to again float the beam 20, the indicator hand will, if the scale be in perfect condition, swing into registration with the 100 lb. graduation on the chart 9, the pull of the poise 33 at the 100 lb. graduation being counterbalanced by the pull of the scale load-offsetting mechanism 5. The scale may thus be tested at every position from zero to full capacity.

The tare and capacity beams may be similarly tested. In testing the beams, however, the poises on the scale beams and on the scale testing device beam are merely moved to corresponding positions, it being unnecessary to lengthen or shorten the link 25, as the platform remains in the same position regardless of the weight that is being counterbalanced by the poises on the tare and capacity beams. Beam scales may be tested in the same way.

When it is desired to test the beams in conjunction with the chart or to test a scale having a capacity greater than the capacity of the beams of the testing device, a counterweight 34 may be hung upon the free end of the beam 20 in the position shown in Figure 2. Since the weight of this counterweight 34 is included in the 50 lbs. that the testing device weighs, this weight, of course, must be supported by the platform of the scale regardless of whether or not it is being used. When it is not being used it may be placed upon the platform, as shown in Figure 1.

In testing large scales it is necessary to provide some means for anchoring the tension rod 28. This may be done by placing an eye-bolt or other anchoring device in the pit beneath the platform or by securing the rod to a beam or timber which extends beneath the frame. The timber may, if desired, be placed beneath one corner of the frame, as it is not necessary that the testing device be located at the center of the platform.

Should the platform supporting mechanism of the scale be so arranged that there is no convenient way of anchoring the tension rod 28, or should there be no convenient way of passing the tension rod through the platform, the scale may be tested by causing the device to exert an upward pull upon the platform. When a scale is to be so tested the platform is first loaded to any desired extent with any convenient material. The weight of such material need not be known. The testing device is then placed upon the stationary frame or upon the floor adjacent thereto in such position that its beams extend over a portion (in the case of large scales, a corner) of the platform. The link 25 is then connected by any suitable means to the platform of the scale and the turnbuckle 26 is tightened until the beam 20 is floated with its poise in zero position. The amount of material on the scale platform is augmented or decreased until the scale indicator stands at full capacity. If the poise 33 is then moved out upon the beam 20, the beam will move downwardly until it strikes the lower stop 32. If an automatic scale is being tested the turnbuckle 26 is then turned upwardly until the beam again floats. If the scale be in perfect condition, the indicator hand will swing backwardly as the turnbuckle 26 is turned until, when the beam 20 is floated, it registers with a graduation 100 lbs. less than full capacity. The scale may thus be tested at all positions from full capacity to zero. When a beam scale is tested by this method it is unnecessary to move the turnbuckle 26, except to compensate for deflection in the platform and supports, after the beams 16 and 20 have been floated at the beginning of the test, since the platform of a beam scale is always in the same position when the scale is in balance regardless of the amount of material being weighed. In testing a beam scale the poises on the testing device and on the scale are merely moved to corresponding positions. If the scale is in perfect condition the scale beam should balance in the trig loop whenever the poises on the beam and on the testing device indictae graduations of the same value.

The relative sizes of the frame members 10 and 11 are such that the member 11 may be placed within the member 10. When the device is to be transported the member 10 is inverted and the member 11 dropped into it, the link 25, rod 28, weight 34 and bar 29 being also placed within the part 10, and the parts 10 and 11 are fastened together by means of a bolt 35. The entire device, which is of about the size of and only slightly heavier than an ordinary sample case, may then be carried by the handle 36.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a supporting frame, a beam carrying frame, and means for detachably securing said beam carrying frame to the exterior of said supporting frame whereby said beam carrying frame is supported in elevated position by said supporting frame, the beam carrying frame being adapted to nest within the supporting frame when the device is knocked down for transportation.

2. In a device of the class described, in combination, a beam carrying frame, a supporting frame therefor, and means for leveling said beam carrying frame upon said supporting frame, said beam carrying frame being adapted to nest within said supporting frame when the device is knocked down for transportation.

3. In a device of the class described, in combination, a frame adapted to be supported by a scale platform, a pair of oppositely extending serially connected beams pivotally supported by said frame, an adjustable tension member depending from one of said beams, and means for anchoring the lower end of said member.

4. A scale testing device comprising, in combination, a frame adapted to be supported upon a platform, force measuring means supported by said frame, and means for exerting a pressure through said frame upon said platform, the parts supported by said platform being sealed to a definite weight corresponding to the weight of a standard test weight.

5. A device for testing automatic scales comprising, in combination, a frame adapted to be supported by the platform of the scale to be tested, a beam fulcrumed on the frame, means permitting the beam to float and limiting its floating movement within narrow limits, and extensible means adapted to connect said beam to an immovable part of the scale.

6. A device for testing automatic scales comprising, in combination, means for exerting a force upon a scale platform, said means including a beam for measuring the force so exerted, and means for limiting the floating movement of the beam to narrow limits.

7. A device for testing automatic scales comprising, in combination, means for exerting a force upon a scale platform, said means including a beam for measuring the force so exerted, means for limiting the floating movement of the beam to narrow limits, and means for compensating for variations, under different pressures, in the elevation of the scale platform.

HALVOR O. HEM.